April 25, 1939.    S. M. WECKSTEIN    2,155,916

CONVEYER ROLLER

Filed Feb. 17, 1938

INVENTOR:
Sanson M. Weckstein
by Cannot Cause
& Gravely
HIS ATTORNEYS.

Patented Apr. 25, 1939

2,155,916

UNITED STATES PATENT OFFICE 2,155,916

CONVEYER ROLLER

Samson M. Weckstein, Canton, Ohio, assignor to The Timken Roller Bearing Company, Canton, Ohio, a corporation of Ohio Application February 17, 1938, Serial No. 190,906

5 Claims. (Cl. 308—208)

My invention relates to conveyer rollers and the like and has for its princpal objects to simplify such constructions and reduce the expense thereof, to minimize the amount of expensive stock required, to provide for adequate lubrication and generally to improve the construction of such devices.

The invention consists principally in mounting the bearings for a conveyer roller or the like on a hollow shaft, mounting over the ends of such shaft, end plates that have portions forming abutments for the bearings and providing means for drawing said end plates towards each other to properly position the bearing. The invention further consists in the conveyer roller and in the parts and combinations and arrangements of parts hereinafter described and claimed.

In the accompanying drawing.

Figure 1:
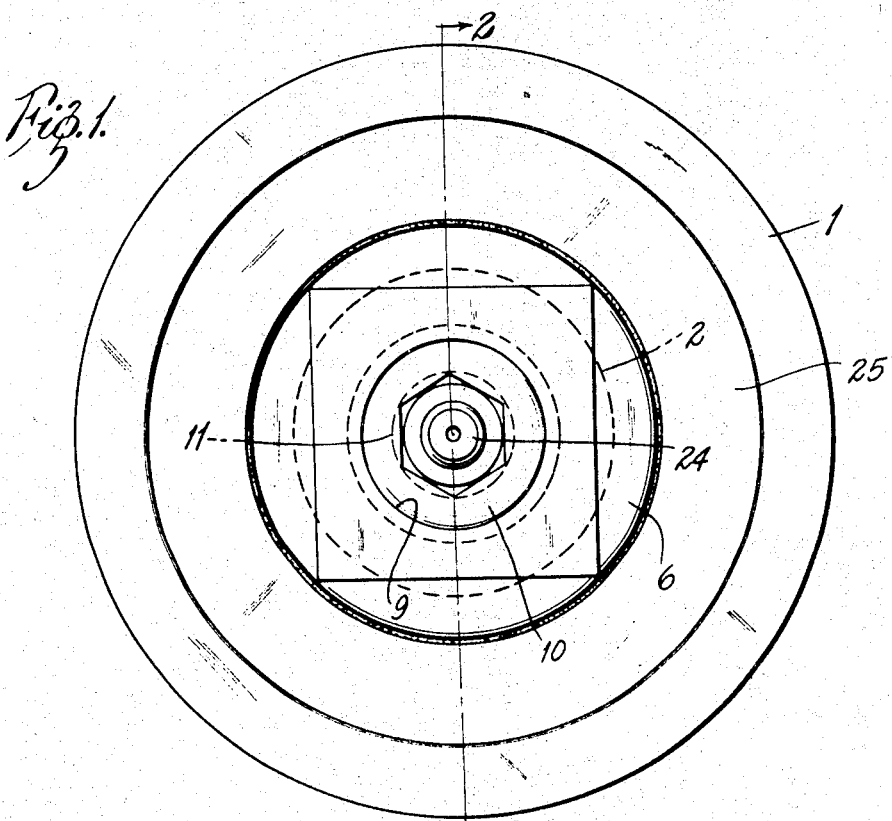
Fig. 1 is an end elevation of a conveyer roller embodying my invention.
Figure 2:
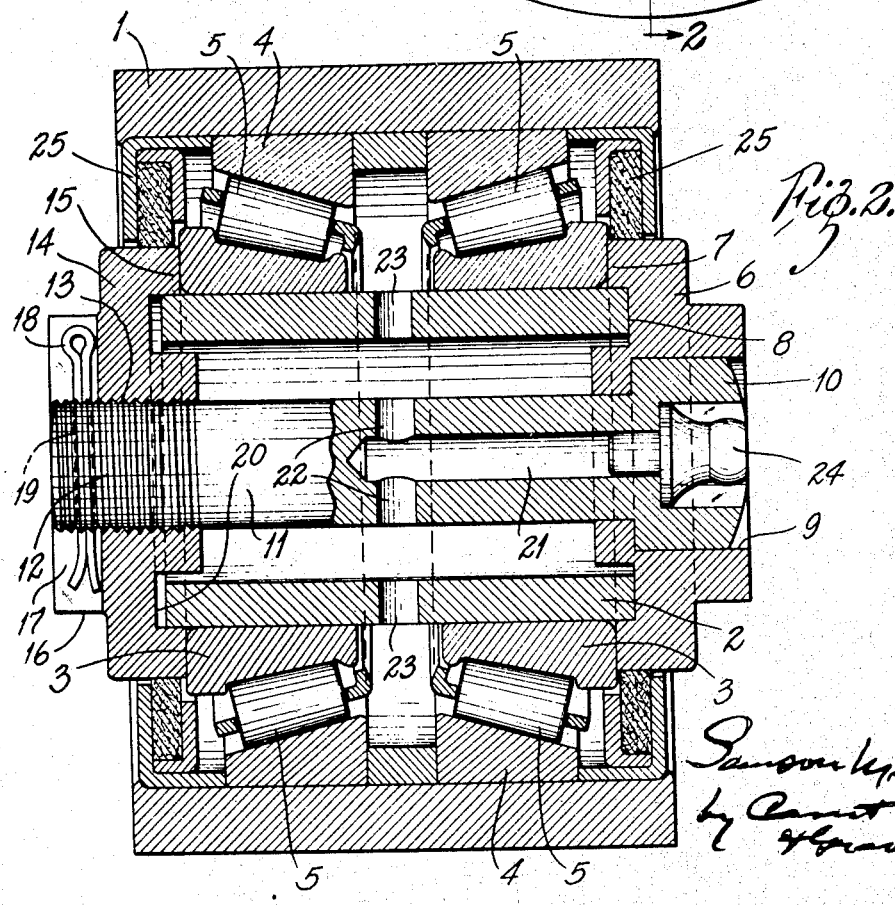
Fig. 2 is a sectional view on the line 2—2 in Fig. 1.

Disposed in a hollow conveyer roller 1 or the like is a hollow shaft 2 shorter in length than the conveyer roller. Mounted on said shaft are bearing cones 3, with their small ends facing inwardly and mounted in the roller 1 are cooperating bearing cups 4, taper bearing rollers 5 being interposed between the respective cups 4 and cones 3.

Mounted on one end of said shaft 2 is an end plate 6 which has a projecting sleeve portion 7 of an inside diameter to fit closely on the end of the hollow shaft 2. Said sleeve portion 7 abuts against a bearing cone 3 and the inner face 8 of said end plate 6 abuts against the end of said shaft 2. Mounted in a circular, central opening 9 in said end plate 6 is an Allen-head cap screw 10 from which projects a pin 11 that extends axially through said hollow shaft 2 and has a threaded end portion 12 extending through a threaded hole 13 in an end plate 14 mounted on the other end of said shaft. Said second or internally threaded end plate 14 has a sleeve 15 closely fitting the end portion of said shaft 2, the end of said sleeve constituting an abutment for the other bearing cone 3. The outer end portion 16 of said second end plate 14 has a diametral slot 17 in which may be mounted a cotter pin 18 or other locking device extending through transverse locking holes 19 in the threaded end of said pin.

By turning the cap screw 10, the second or internally threaded plate 14 is drawn toward the first plate 6, thus tightening up the bearings on the shaft. Sufficient space is left between the inner face 20 of said second plate 14 and the end of the shaft 2 to allow for any necessary adjustment of the bearings. After the proper bearing adustment is obtained, the locking device is applied.

The pin 11 may be provided with an axial bore 21 extending about to the middle thereof and with transverse bores 22 and the hollow shaft 2 may be provided with radial openings 23. A grease fitting 24 is mounted in the hollow cap screw 10, so that suitable lubricant may be forced through the pin into the shaft and bearing assembly. Suitable closures 25 are mounted in the ends of the conveyer roller.

The above described construction has numerous advantages. The hollow shaft may be made of relatively cheap material and the outer or conveyer roller member may be made of fairly cheap material, and it may be selected with particular reference to the requirements of the type of conveyer in which the roller is to be used. The end plates may be cast or may be machined from bar stock and they are very much alike in construction.

The end plates are provided with bosses for engagement with roller supporting brackets. The roller is compact and self-contained and can be shipped packed with lubricant and ready for installation. The parts may be easily assembled and disassembled, the bearings are readily adjusted and additional lubricant can be provided when needed.

Obviously numerous changes may be made without departing from the invention and I do not wish to be limited to the precise construction shown.

What I claim is:

1. In combination with a conveyer roll or the like, a hollow shaft in said roll, taper roller bearings between said shaft and said roll, the ends of said shaft projecting beyond the ends of the inner bearing members of said bearings, end plates, each having an annular groove receiving one end of said hollow shaft and a portion engaging the end of an inner bearing member and means for drawing said end plates towards each other for adjusting and positioning the bearings.

2. In combination with a conveyer roll or the like, a hollow shaft in said roll, taper roller bearings between said shaft and said roll, the ends of said shaft projecting beyond the ends of the inner bearing members of said bearings, annular end plates each having an annular groove receiving one end of said hollow shaft, a portion engaging the end of an inner bearing member and a squared head for cooperation with a roll mounting device and a pin extending from end plate to end plate for drawing said end plates towards each other for adjusting and positioning the bearings.

3. In combination with a conveyer roll or the like, a hollow shaft in said roll, taper roller bearings between said shaft and said roll, the ends of said shaft projecting beyond the ends of the inner bearing members of said bearings, annular end plates each having an annular groove receiving one end of said hollow shaft, a portion engaging the end of an inner bearing member and a squared head for cooperation with a roll mounting device, a pin extending from end plate to end plate for drawing said end plates towards each other for adjusting and positioning the bearings and seals interposed between said roll and said end plates.

4. In combination with a conveyer roll or the like, a hollow shaft in said roll, taper roller bearings between said shaft and said roll, the ends of said shaft projecting beyond the ends of the inner bearing members of said bearings, annular end plates each having an annular groove receiving one end of said hollow shaft and a portion engaging the end of an inner bearing member, one of said end plates being counterbored and the other being internally threaded and a pin having a head mounted in said counterbore and a threaded portion cooperating with said internally threaded portion of said second end plate whereby said end plates may be drawn towards each other for adjusting and positioning the bearings.

5. In combination with a conveyer roll or the like, a hollow shaft in said roll, taper roller bearings between said shaft and said roll, the ends of said shaft projecting beyond the ends of the inner bearing members of said bearings, annular end plates each having an annular groove receiving one end of said hollow shaft and a portion engaging the end of an inner bearing member, one of said end plates being counterbored and the other being internally threaded and a pin having a head, said head having a polygonal recess for cooperation with a tool for rotating said pin mounted in said counterbore and a threaded portion cooperating with said internally threaded portion of said second end plate whereby said end plates may be drawn towards each other for adjusting and positioning the bearings.

SAMSON M. WECKSTEIN.